US008189523B2

(12) United States Patent
Barbaresi et al.

(10) Patent No.: US 8,189,523 B2
(45) Date of Patent: May 29, 2012

(54) METHOD AND APPARATUS FOR MANAGING THE ASSIGNMENT OF RADIO RESOURCES OF A RADIO COMMUNICATIONS NETWORK

(75) Inventors: Andrea Barbaresi, Turin (IT); Sergio Barberis, Turin (IT); Robert Farotto, Turin (IT); Marco Tosalli, Turin (IT)

(73) Assignee: Telecom Italia S.p.A., Milan (IT)

( * ) Notice: Subject to any disclaimer, the term of this patent is extended or adjusted under 35 U.S.C. 154(b) by 358 days.

(21) Appl. No.: 12/448,610

(22) PCT Filed: Dec. 28, 2006

(86) PCT No.: PCT/EP2006/012579
§ 371 (c)(1),
(2), (4) Date: Jun. 26, 2009

(87) PCT Pub. No.: WO2008/080422
PCT Pub. Date: Jul. 10, 2008

(65) Prior Publication Data
US 2010/0039999 A1      Feb. 18, 2010

(51) Int. Cl.
*H04W 4/00* (2009.01)
(52) U.S. Cl. ......... 370/329; 370/468; 370/252; 370/230
(58) Field of Classification Search .......... 370/329–339, 370/380–427, 229–235, 252–253, 328–338, 370/468; 455/436–460
See application file for complete search history.

(56) References Cited

U.S. PATENT DOCUMENTS 5,542,093 A    7/1996  Bodin et al.
(Continued)

FOREIGN PATENT DOCUMENTS
EP      1 635 602 A1    3/2006
(Continued)

OTHER PUBLICATIONS

Tolli, et al., "Adaptive Load Balancing between Multiple Cell Layers", VTC 2002, IEEE 56th Vehicular Technology Conference Proceedings, vol. 1 of 4, Conf. 56, pp. 1691-1985, (Sep. 24, 2002).
(Continued)

*Primary Examiner* — Pao Sinkantarakorn
*Assistant Examiner* — Iqbal Zaidi
(74) *Attorney, Agent, or Firm* — Finnegan, Henderson, Farabow, Garrett & Dunner, L.L.P.

(57) ABSTRACT

A method of managing radio resources of a radio communications network, includes: upon receiving a new service request for a service to be provided, assessing whether there are radio resources of a first set, adapted to and available for satisfying the request, and: in the affirmative case, exploiting the available radio resources for satisfying the new service request; in the negative case: calculating an amount of the adapted radio resources to be set free for satisfying the service request; assessing whether there is at least one first already served service request that, at the time the new service request is received, is being served using the calculated amount of radio resources of the first set, and that can continue to be served by assigning thereto radio resources of a second set, different from the first set, not adapted to serving the new serving request; in the affirmative case: calculating an amount of the radio resources of the second set necessary for serving the at least one already served service request; assessing whether the calculated amount of radio resources of the second set is available; if the calculated amount of radio resources of the second set is available, re-assigning to the at least one first already served service request the radio resources of the second set, and assigning to the new service request the radio resources of the first set previously assigned to the already served service request; in the negative case, refusing the new service request.

12 Claims, 10 Drawing Sheets

U.S. PATENT DOCUMENTS

| | | | |
|---|---|---|---|
| 2004/0121777 | A1 | 6/2004 | Schwarz et al. |
| 2006/0052103 | A1 | 3/2006 | Mikoshiba et al. |
| 2011/0244868 | A1* | 10/2011 | Senarath et al. ............. 455/442 |

FOREIGN PATENT DOCUMENTS

| | | | |
|---|---|---|---|
| WO | WO 94/05130 | | 3/1994 |
| WO | WO 02/089514 A1 | | 11/2002 |
| WO | WO 2005/101880 | * | 10/2005 |
| WO | WO 2005/101880 A1 | | 10/2005 |
| WO | WO 2005/101889 A1 | | 10/2005 |

OTHER PUBLICATIONS

Lincke, "Vertical handover policies for common radio resource management", International Journal of Communications Systems, Int. J. Commun. Syst. 18:527-543, pp. 527-543, (2005).

3GPP TR 25.881, "$3^{rd}$ Generation Partnership Project; Technical Specification Group Radio Access Network; Improvement of RRM across RNS and RNS/BBS (Release 5)", V5.0.0, pp. 1-44, (Dec. 2001).

3GPP TR 25.891, "$3^{rd}$ Generation Partnership Project; Technical Specification Group Radio Access Network; Improvement of RRM across RNS and RNS/BSS (Post Rel-5); (Release 6)", V0.3.0, pp. 1-17, (Feb. 2003).

3GPP TR 23.934, "$3^{rd}$ Generation Partnership Project; Technical Specification Group Services and System Aspects; 3GPP system to Wireless Local Area Network (WLAN) Interworking; Functional and architectural definition (Release 6)", V1.0.0, pp. 1-37, (Aug. 2002).

ETSI TR 101 957, "Broadband Radio Access Networks (BRAN); HIPERLAN Type 2; Requirements and Architectures for Interworking between HIPERLAN/2 and $3^{rd}$ Generation Cellular systems", V1.1.1, pp. 1-56, (Aug. 2001).

3GPP TS 04.18, "$3^{rd}$ Generation Partnership Project; Technical Specification Group GSM/EDGE Radio Access Network; Mobile radio interface layer 3 specification; Radio Resource Control Protocol (Release 1999)", V8.27.0, pp. 1-315, (May 2006).

3GPP TS 25.331, "$3^{rd}$ Generation Partnership Project; Technical Specification Group Radio Access Network; Radio Resource Control (RRC); Protocol Specification (Release 5)", V5.17.0, pp. 1-1045, (Jun. 2006).

* cited by examiner

METHOD AND APPARATUS FOR MANAGING THE ASSIGNMENT OF RADIO RESOURCES OF A RADIO COMMUNICATIONS NETWORK

CROSS REFERENCE TO RELATED APPLICATION

This application is a national phase application based on PCT/EP2006/012579, filed Dec. 28, 2006.

BACKGROUND OF THE INVENTION

1. Field of the Invention

The present invention generally relates to the management of the assignment of resources, particularly radio resources of mobile communications networks, like mobile telephony networks and wireless data networks, to entities requesting services from the network.

2. Description of Related Art

In the field of radio communications networks, several different technologies and several different standards coexist. The radio communications networks of the second generation (so-called "2G" networks, like those complying with the GSM—Global System for Mobile communications) standard, which nowadays are the most broadly deployed and are mostly suited for enabling voice communications, will in the coming years go more and more side by side with radio communications networks of new generation, such as third-generation ("3G") networks (like those complying with the UMTS—Universal Mobile Telecommunications System—standard) and fourth-generation networks (still in the course of being standardized), designed for supporting, in addition to plain voice communications, data exchange and multimedia (e.g., video telephony, television broadcasting and similar) services, as well as broadband data communications networks of the Wireless LAN (WLAN) type.

A common approach in network deployment is not to completely replace 2G networks already in operation with new-generation networks, rather to integrate the different types of networks. The integration between radio communications networks of new generation with 2G networks is made possible by the fact that the new network standards are specifically defined in such a way as to enable the integration of different network standards. For example, in the 3GPP (Third Generation Partnership Project) specifications, that set forth the characteristics of the UMTS, several procedures are defined enabling the interoperation ("interworking") with GSM networks (all the 3GPP specification documents cited in this description can be downloaded from the Internet site www.3GPP.org). In particular, in the 3GPP Technical Report (TR) 25.881 titled "Improvement of RRM across RNS and RNS/BSS, Release 5", and in the 3GPP TR 25.891 titled "Improvement of RRM across RNS and RNS/BSS, Release 6" functional models and network architectures are defined where Common Radio Resource Management (CRRM) policies can be applied.

A known market trend is that of using, in certain geographic areas referred to as "hot spots", WLAN technologies, so as to enable users that happen to be located in those areas to enjoy a broadband access to a number of data communications services like Internet access. WLAN technologies can also be integrated within a mobile telephony network, particularly in the access network segment. For this reason, inter-operation mechanisms are also being defined that enable WLAN technologies (e.g., complying with the IEEE 802.11 family of standards, or with the ETSI standard known as HIPERLAN2) to interoperate with 3G mobile telephony networks so as to enable access to the transport network thereof. For example, the 3GPP TR 23.934, titled "3GPP system to Wireless Local Area Network (WLAN) interworking functional and architectural definition, Release 6" specifies the functional requirements to be satisfied by those network architectures that include IEEE 802.11 WLAN accesses in the UMTS network. Similarly, the ETSI TR 101.957, titled "Broadband Radio Access Networks (BRAN): HIPERLAN Type 2; Requirements and architectures for interworking between HIPERLAN/2 and $3^{rd}$ generation cellular systems", specifies the interoperation mechanisms of HIPERLAN2 WLANs with the UMTS network.

Radio communications systems integrating two or more Radio Access Technologies (RATs) are referred to as "multi-RAT" systems.

So-called "multi-mode" mobile telecommunications terminals are already available on the market (like cellular phones, palmtops, Personal Digital Assistants—PDAs—, peripheral cards for Personal Computers—PCs, etc.) which can connect to networks complying with different standards, like the GSM, the UMTS, IEEE 802.11b/g/a WLAN. For example, dual-mode mobile phones can work both in GSM and in UMTS systems.

Generally, CRRM policies are implemented by means of CRRM algorithms that run on specific network equipment, like for example the Radio Network Controllers (RNCs) of a UMTS network, or the Base Station Controllers (BSCs) of a GSM network, and that, upon receiving service requests from users, allocate them on the better pool of radio communications resources, depending on a number of factors like the nature of the requested service, the load status of the network at the time the service request is received, the overall radio resources available.

Several CRRM policies solutions have been proposed in the art.

For example, in the International applications WO 2005/101880 and WO 2005/101889, solutions are proposed to the problem of the decisions to be taken by the network as to which type of radio access is to be assigned to incoming service requests.

In S. J. Lincke, "Vertical handover policies for common radio resource management", International Journal of Communication Systems, vol. 18, No. 6, pp. 527-543, an overview is presented of simulation studies on engineering traffic across wireless networks using "vertical handovers". In that paper, by "vertical handovers" it is meant handovers between "component networks" of an integrated heterogeneous network comprising a GSM-900 network, a DCS-1800 network, a UMTS network, a WLAN; component networks are for example the GSM cells, the EDGE (Enhanced Data rate for GSM Evolution), the FDD (Frequency Division Duplexing) and the TDD (Time Division Duplexing) cells of the UMTS network, the IEEE 802-11 b hot-spots of the WLAN. Three types of vertical handovers are defined: cell-size switch (handover to a different cell size), technology switch (handover to a different air interface protocol technology), and base station mode switch (handover to a base station that will change its technology to carry the session). According to the author of the cited paper, an adaptive placement technique may rearrange sessions between RANs (Radio Access Networks) in order to serve hard-to-place sessions. The rearranging of sessions can be implemented using a substitution technique whereby flexible mobile terminals overflow to free capacity for arriving inflexible sessions, which cannot be carried by alternative RANs.

SUMMARY OF THE INVENTION

The Applicant believes that it may indeed be useful, for the operator of a heterogeneous network like a multi-RAT network, e.g. a network including GSM cells, UMTS cells and WLAN hot-spots, to be capable of exploiting, in a coordinated and synergic way, the different radio access technologies, in order to improve the overall efficiency and the exploitation of the communications network as a whole.

In particular, it may be useful for the network operator to define CRRM policies, and related implementing algorithms, that, whenever a service is requested, are able to find, among the different access technologies supported by the network, the one that is more suitable to support the requested service, and thus to assign the service request to that access technology, as well as to subsequently move, re-assign the service, while it is being provided, to another access technology, in the aim of maximizing the system performance and optimizing the costs for re-assigning the resources.

In order to achieve these goals, whenever the network receives a new service request from a user, conditioned to the fact that the requested service can be provided by two or more different access technologies supported by the network, the access technology to be used for providing the service is chosen taking into account the possibility of changing the access technology currently exploited for managing one or more other services which are already in progress, exploiting Vertical HandOver (VHO) mechanisms.

VHO mechanisms allow modifying the (radio) access technology initially selected for providing a certain service, causing the re-assignment of one or more services, already being provided, from a (radio) access technology to another. VHO mechanisms are normally relied upon when the radio signal quality perceived by a user worsen too much, and thus a change in radio access technology is attempted to avoid interruption of the service being provided (in particular, VHO mechanisms between the GSM and the UMTS are set forth in the 3GPP TS 25.331 and 04.18).

For the purposes of the present invention, the term VHO is used as a synonym of "inter-system handover" and "inter-RAT handover".

A policy that allocates new service requests to the one of the available access technologies that is prima facie more suitable may be not sufficient to ensure the efficient exploitation of the network resources. Indeed, dynamic phenomena that may take place during the provision of a service may for example cause saturation of the resources in case of high traffic, and even if some network resources are freed, the new service requests may not be of a nature suitable to be provided by the network resources which became free. On the contrary, moving some of the services already being provided to the freed network resources may allow to set free further resources, which might be suitable to serve the new service requests. For example, let it be assumed that all the GSM and UMTS resources are initially occupied, and then some UMTS resources become available, because the provision of some services ends; with a conventional CRRM policy, new service requests that can be serviced only by the GSM resources should be refused, even if there are UMTS resources available. If, on the contrary, relying on VHO mechanisms, some of the ongoing calls of dual-mode (i.e., GSM and UMTS) terminals are moved from the GSM to the UMTS resources, GSM resources are freed, and thus made available for managing new service requests necessitating GSM resources. Thus, exploiting VHO mechanisms, the service requests allocations previously made are reconsidered, based on the new conditions of the network. It should be understood that, according to the present invention, the VHO mechanisms are not invoked as a consequence to a worsening of the radio quality perceived by the user, rather they are deliberately invoked in the attempt to make the exploitation of the network resources more efficient.

The Applicant has found that in order to exploit VHO mechanisms for dynamically re-allocating already allocated radio resources of the different RATs of an heterogeneous network, so as to accept new service requests, it is necessary to have an estimation of the capacity of the different RATs; based on said capacity estimation, the amount of radio resources to be re-allocated can be quantified, and the VHO mechanisms invoked for selectively moving on-going sessions from one RAT to another.

According to an aspect of the present invention, a method is provided of managing radio resources of a radio communications network, comprising:

upon receiving a new service request for a service to be provided, assessing whether there are radio resources of a first set, adapted to and available for satisfying the request, and:
    in the affirmative case, exploiting the available radio resources for satisfying the new service request;
    in the negative case:
        calculating an amount of the adapted radio resources to be set free for satisfying the service request;
        assessing whether there is at least one first already served service request that, at the time the new service request is received, is being served using the calculated amount of radio resources of the first set, and that can continue to be served by assigning thereto radio resources of a second set, different from the first set, not adapted to serving the new service request;
        in the affirmative case:
            calculating an amount of the radio resources of the second set necessary for serving said at least one already served service request;
            assessing whether the calculated amount of radio resources of the second set is available;
            if the calculated amount of radio resources of the second set is available, re-assigning to the at least one first already served service request the radio resources of the second set, and assigning to the new service request the radio resources of the first set previously assigned to the already served service request;
        in the negative case, refusing the new service request.

According to another aspect of the present invention, an apparatus for managing radio resources of a radio communications network is provided, the apparatus being adapted to:

upon receiving a new service request for a service to be provided, assessing whether there are radio resources of a first set, adapted to and available for satisfying the request, and:
    in the affirmative case, exploiting the available radio resources for satisfying the new service request;
    in the negative case:
        calculating an amount of the adapted radio resources to be set free for satisfying the service request;
        assessing whether there is at least one first already served service request that, at the time the new service request is received, is being served using the calculated amount of radio resources of the first set, and that can continue to be served by assigning thereto radio resources of a second set, different from the first set, not adapted to serving the new service request;

in the affirmative case:

calculating an amount of the radio resources of the second set necessary for serving said at least one already served service request;

assessing whether the calculated amount of radio resources of the second set is available;

if the calculated amount of radio resources of the second set is available, re-assigning to the at least one first already served service request the radio resources of the second set, and assigning to the new service request the radio resources of the first set previously assigned to the already served service request;

in the negative case, refusing the new service request.

Preferred features are set forth in the dependent claims.

BRIEF DESCRIPTION OF THE DRAWINGS

The features and advantages of the present invention will be made apparent by reading the following detailed description of an embodiment thereof, provided merely by way on non-limitative example, description that will be conducted making reference for better clarity to the attached drawings, wherein.

DETAILED DESCRIPTION OF THE PREFERRED EMBODIMENT(S) OF THE INVENTION

In the following of the present description, reference will be made, merely by way of non-limitative example, to currently known types of radio communications networks, namely the GSM, the GPRS (General Packet Radio Service), the EDGE (Enhanced Data rate for GSM Evolution), the UMTS (Universal Mobile Telecommunications System), the WLAN, and to CRRM algorithms that are used for the interworking and the cooperation of such networks. However, it will be appreciated that the present invention has a more general applicability, being in particular not restricted to any specific type and number of radio communications networks.

Figure 1:
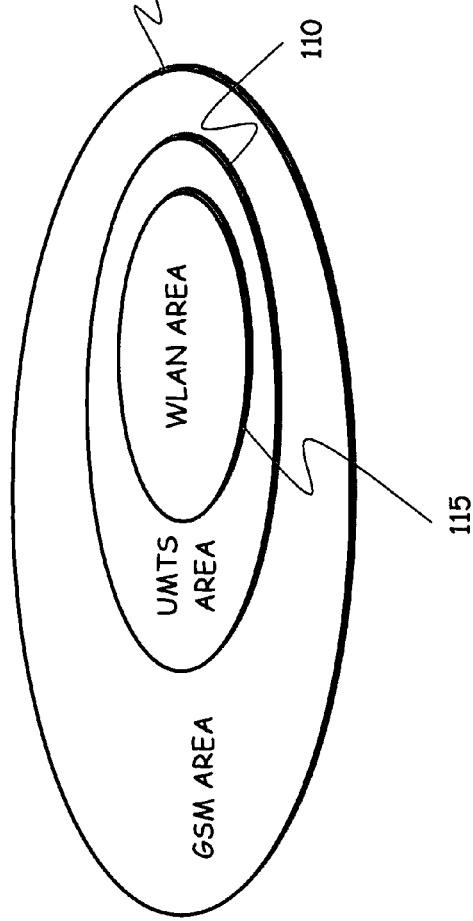
FIG. 1 schematically shows an exemplary scenario wherein the present invention is applicable.

FIG. 1 depicts a possible scenario wherein the present invention can be applied. A geographic area of interest, denoted as 105, is assumed to be served by a GSM network; a portion 110 of the area 105 is assumed to be also served by a UMTS network (thus, the area 110 is served by both the GSM network and the UMTS network); in a portion 115 of the area 110, coverage by a WLAN network is also assumed to exist (thus, the area 115 is jointly served by the GSM network, the UMTS network and the WLAN hot-spot). This scenario, albeit not limitative for the present invention, is rather true-to-reality, because it assumes that the GSM networks (or other 2G networks), nowadays largely diffused, in some areas (e.g., in urban areas, or along motorways) work side-by-side with UMTS networks (or other 3G networks), which are currently not as broadly deployed as 2G networks, and furthermore that, in limited portions of the territory (e.g., within hotels, or service stations along the motorways), WLAN hot-spots are present that enable a broadband connection to, e.g., the Internet (the fact that, in the considered scenario, the hot-spots 115 are contained within the area 110 covered by the UMTS is not to be considered limitative, but it is nonetheless a reasonable assumption, because WLAN hot-spots are usually placed in areas characterized by a high concentration of users with low mobility requiring broadband data communications services).

Figure 2:
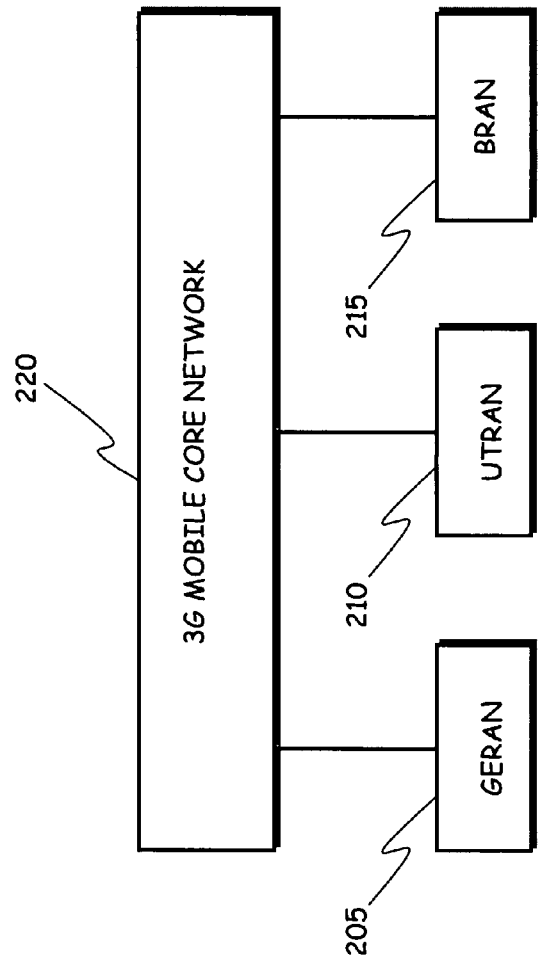
FIG. 2 schematically shows, in terms of functional blocks, the structure of an illustrative, multi-RAT communications network reflecting the scenario of FIG. 1.

FIG. 2 schematically shows, in terms of functional blocks, the structure of an illustrative, multi-RAT communications network reflecting the scenario of FIG. 1. The multi-RAT network comprises in particular a GERAN (GPRS-EDGE RAN) 205, used by GSM/GPRS/EDGE terminals for accessing the network, a UTRAN (UMTS RAN) 210, used by UMTS (or GSM-UMTS dual-mode) terminals for accessing the network, and a BRAN (Broadband RAN) 215 used by WLAN (or GSM-UMTS-WLAN multi-mode) terminals for accessing the network. A 3G core network 220 forms the transport segment of the multi-RAT network.

Figure 3:
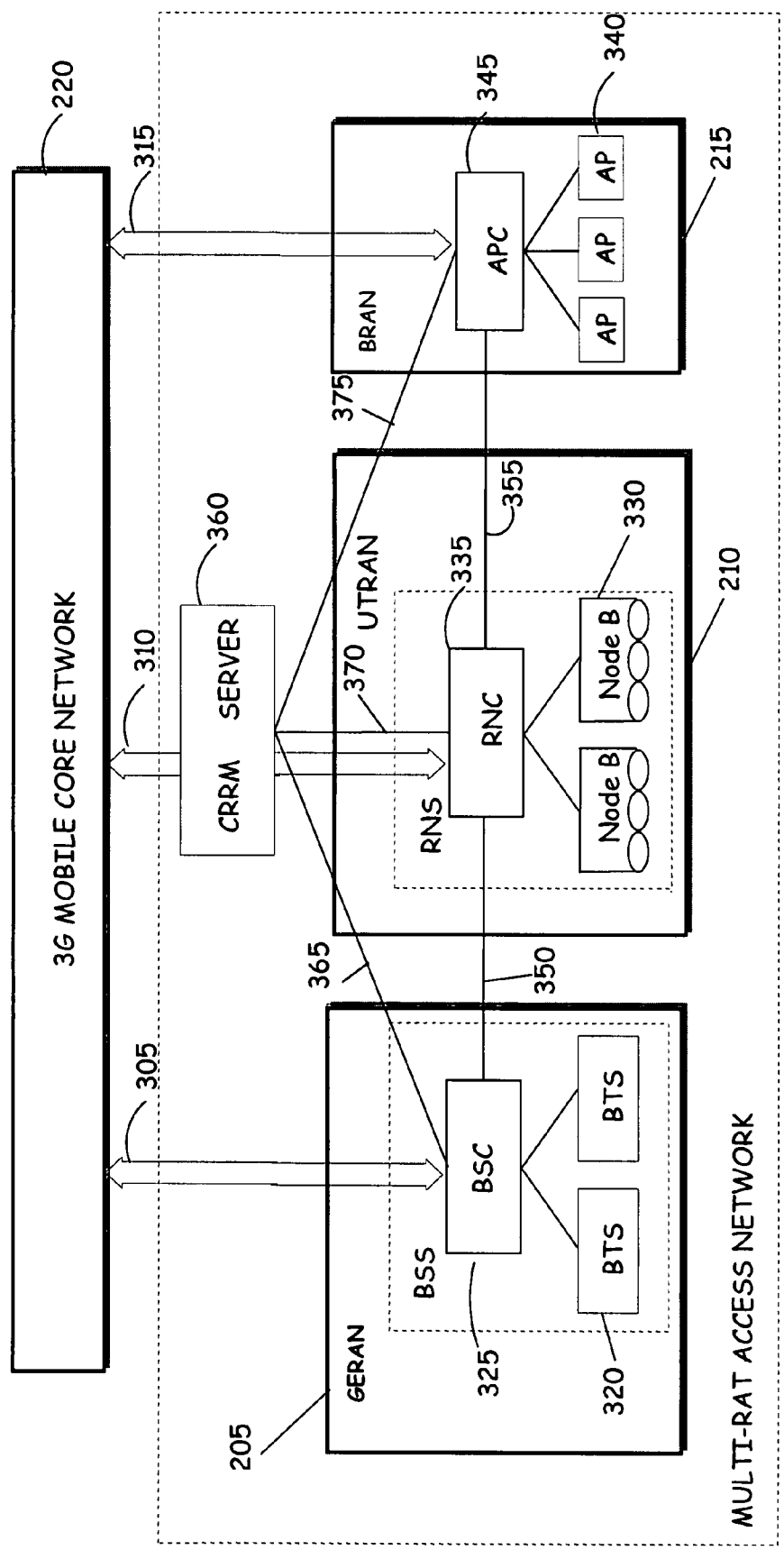
FIG. 3 schematically shows, still in terms of functional blocks but in greater detail, an architecture of the multi-RAT network of FIG. 2.

The network architecture in FIG. 2 is shown in greater detail in FIG. 3; the core network 220 is connected: to the GERAN 205 through an interface 305, for example the interface called "A" interface or "Gb" interface, depending on the core network domain; to the UTRAN 210 through an interface 310, for example corresponding to the "Iu" interface; and to the BRAN 215 through an interface 315 (for example, the interface sometimes referred to as the "Iu-like" interface).

The GERAN 205 comprises, in a way per-se known in the art, Base Station Subsystems (BSS), including Base Transceiver Stations (BTSs) 320 and Base Station Controllers (BSCs) 325. The UTRAN comprises, also in a way per-se known in the art, Radio Network Subsystems (RNS), including Node-Bs 330 and Radio Network Controllers (RNCs) 335. The BRAN 215 comprises, still in a way per-se known in the art, Access Points (APs) 340 and Access Points Controllers (APCs) 345.

The BSCs 325, the RNCs 335 and the APCs 345 may exchange information through the core network 220, or, when suitable interfaces 350 (corresponding to the "Iur-g" interface) and 355 (also referred to as the "Iur-like" interface) are provided, they can communicate directly with each other.

CRRM algorithms can for example reside and be executed by the BSCs 325, the RNCs 335 and the APCs 345. Alternatively, a network entity, denoted 360 in the drawing and hereinafter referred to as "CRRM server" may be optionally provided, dedicated to the common, integrated management of the resources of the multi-RAT network. The CRRM server 360 may be connected to the BSCs 325 through an interface 365, to the RNCs 335 through an interface 370, and to the APCs through an interface 375. The CRRM server 360 may request to the BSCs 325 information about the state of the GSM network cells, as well as it may request to the RNCs 335 information about the state of the UMTS network cells; similarly, the CRRM server may request to the APCs 345 information about the state of the WLAN hot-spots.

Based on the specific service nature, any service supported by the multi-RAT network may be allocated to only one or, on the contrary, to two or even more different radio access networks; for example, a voice communication service (voice call) may be offered through either the GSM or the UMTS network, whereas a specific data exchange service (e.g. a videocall) can only be provided through the UMTS network or the WLAN, not through the GSM. For the considered scenario, different types of services may be envisaged. In particular, as far as real-time services are considered, the network shall guarantee a pre-defined quality profile, which essentially cannot vary in time, and hence, if the network, when a real-time service is requested, does not have sufficient resources for providing the requested service with the appropriate level of quality, the new service request is preferably blocked and refused. Examples of real-time services in the considered scenario are, in addition to voice calls, videocalls (a data exchange service belonging to the "CONVERSATIONAL" class) and multimedia content delivery by a content provider (server) (a service belonging to the "STREAMING" class).

According to an embodiment of the present invention, the CRRM algorithm, when service requests are received by the network subscribers, determines whether the service request is to be refused or accepted, and, in case it is accepted, which radio access technology, i.e., which radio access network among the three available RANs, to use for providing the service. Additionally, the CRRM algorithm is capable of determining whether, in order to accept the new service request, or to improve the performance, one or more services already being provided exploiting a previously selected one of the three available radio access technologies can be moved, re-assigned to a different radio access technology, for example exploiting VHO mechanisms.

By way of example only, let the scenario of FIG. 1 be considered, and let it be assumed that different users request two distinct real-time services: a voice call service and a generic real-time data exchange service (merely for the sake of simplicity, it will be assumed that the network supports only two services: voice calls and just one type of data exchange service; this is however not to be construed limitatively).

The following constraints are also assumed for the two available services:
the GSM system can only be used for voice calls;
the UMTS system can be used for both voice calls and for data exchange calls; and
the WLAN system can be used for data exchange calls only.

Each RAN is assumed to have a maximum limit of services that can be provisioned simultaneously.

In particular, considering the generic GSM cell, the maximum number of voice calls that can be supported is given by the maximum number of circuit-switched connections that the cell can handle.

In the case of the generic WLAN hot-spot, it can be assumed that there is a maximum number of users that can request data exchange services, exceeded which maximum number the WLAN radio access system is no longer capable of ensuring the Quality of Service (QoS) profile requested for the service. Such maximum number of users can be determined based on the specific WLAN technology (for example, IEEE 802.11b) and the throughput requested by the considered data exchange service, setting for example a minimum limit for the transfer speed of the data that it is intended to offer to each user, or alternatively a limit to the maximum tolerable transfer delay.

Figure 4:
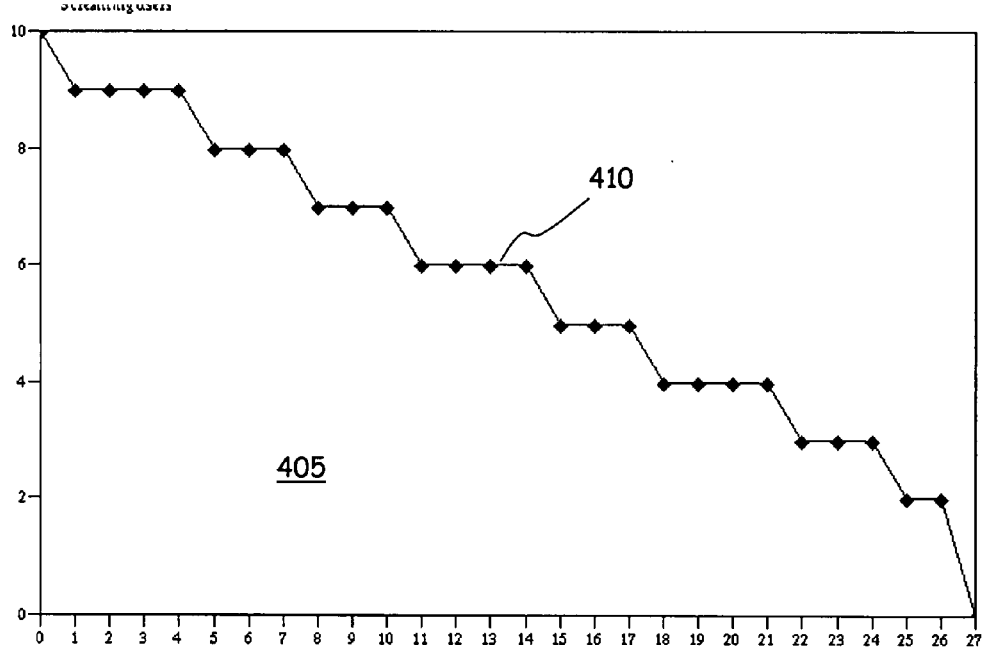
FIG. 4 is a diagram showing a capacity region for a UMTS network in the exemplary case of two services: a voice call service and a data exchange service.

In the case of the generic UMTS cell, the different possible combinations of maximum number of users requesting to set up voice calls and data exchange sessions (i.e., the so-called "service mix") that the cell can handle, with the available radio resources, should be considered. Such combinations determine a cell's "capacity region". Generally speaking, the cell's capacity region can be uniquely defined by means of a function $Cd(n_v)$, expressing the maximum number of users requesting data exchange services that the system can accept, in presence of $n_v$ already ongoing voice calls. From a practical viewpoint, the function $Cd(\ )$ that expresses the capacity region of a specific UMTS cell can be determined considering the QoS profile of the considered services. An example of capacity region for a UMTS cell that is assumed to have to support voice calls and a data exchange service belonging to the "STREAMING" class at 16 kbits/s in uplink and 128 kbit/s in downlink is depicted in FIG. 4, where on the abscissa the number $n_v$ of users requesting voice calls is indicated, whereas in ordinate there is indicated the number $n_d$ of users requesting the data exchange service. The capacity region for the considered UMTS cell is the region 405 delimited by the (positive) ordinate and abscissa (semi-)axes and a capacity region boundary 410; the capacity region boundary 410 is the limit above which the UMTS cell is no longer capable of accepting further service requests; each point of such boundary 410 represents an optimum mix of traffic for which the UMTS cell is fully exploiting its resources. On the contrary, below the capacity region boundary 410, the cell's resources are under-exploited, therefore other service requests can be allocated, based on the free radio resources available.

Figure 5:
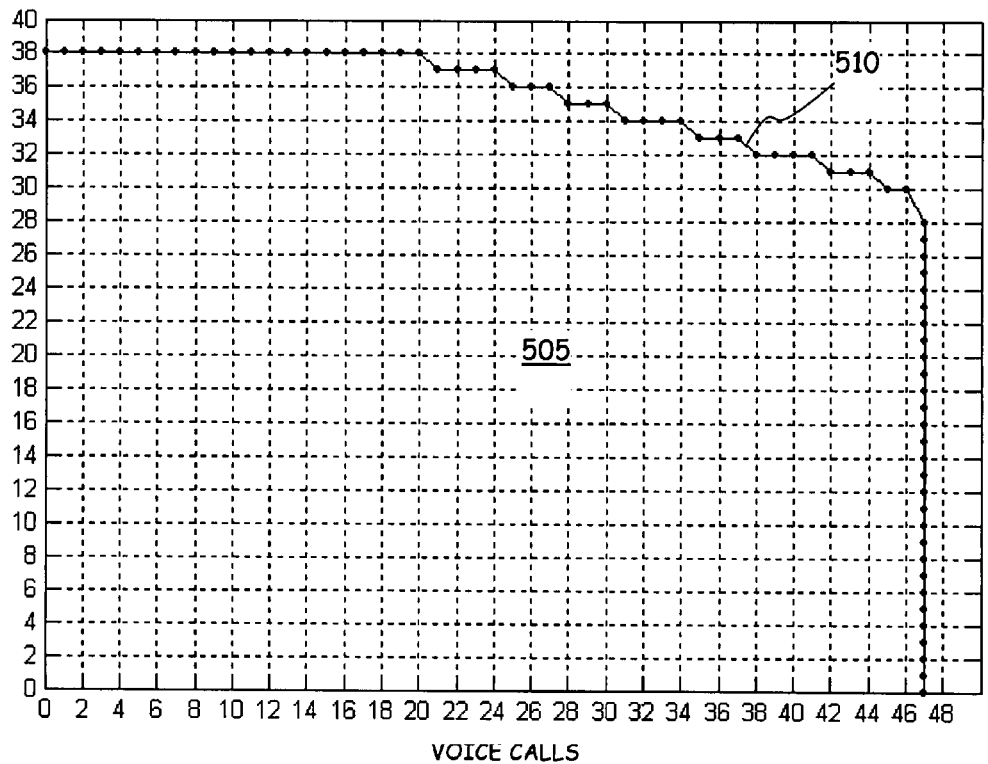
FIG. 5 is a diagram showing a joint capacity region for the multi-RAT network of FIG. 2.

In the case of a multi-RAT network, particularly in the exemplary scenario of FIG. 1, it should be considered that, in addition to the UMTS cell, capable of supporting both voice calls and data exchange service requests, there are also a GSM cell and a WLAN hot-spot. Assuming, merely by way of example, that, given the available radio resources, the GSM cell is capable of handling a maximum of 20 voice calls, and that the WLAN hot-spot is capable of handling up to a maximum of 28 users requesting the data exchange service, a "joint capacity region" can be determined, as for example described in the published International application WO2005/101889. FIG. 5 sketches an example of joint capacity region for the scenario considered in FIG. 1.

The joint capacity region is adapted to provide a description of the total traffic that the multi-RAT network can handle, depending on the specific mix of services being requested, and the greater or lesser capacity of the individual RANs to simultaneously support a certain number of users of each type.

In general, the joint capacity region will be a region of a multi-dimensional space, the number of dimensions of the space corresponding to the number of different services that the multi-RAT network can provide; the capacity region boundary will be a surface, in the multi-dimensional space.

In practical cases, it is not always possible to use any one of the different access systems available for each service request. This is primarily due to the fact that the areas of coverage are different for each access system, due to the peculiarities of the different access systems (for example, a WLAN hot-spot covers only a rather limited area whereas a single GSM or UMTS cell may cover a much wider area). Another reason for which it is not always possible to freely choose the radio access technology that, in theory, is most suitable for providing a certain service is that the service request may come from a terminal that is capable of operating with only one of the different technologies (not being compatible with other standards).

On the basis of the above considerations, referring to the scenario of FIG. 1, from the viewpoint of the users requesting a service, the following four typologies of service requests can be identified (based on the combination of radio coverage and terminal capabilities):

- voice call requests that can be served by the GSM only;
- voice call requests that can be indifferently served by either the GSM or the UMTS;
- data exchange requests that can be served by the UMTS only; and
- data exchange requests that can be indifferently served by either the UMTS or the WLAN.

Hereinafter, the following terminology will be adopted:

- ongoing call (voice or data): it denotes a voice call, or a data exchange session, that has been already accepted by the access system, and that is currently going on, within the considered cell;
- call in Hand-Over (HO) from a different cell: it denotes a call (voice or data) that has been already accepted by the access system, which is going to be transferred from a different cell to the cell considered, due to radio signal quality issues (independent from the decision of the CRRM algorithm);
- call in HO to a different cell: it denotes a call (voice or data) that has been already accepted by the access system, and which is going to be transferred from the considered cell to another cell due to radio signal quality issues (independent from the decision of the CRRM algorithm); from the viewpoint of the considered cell, this case is assimilated to a normal call termination;
- VHO: it denotes the case in which an ongoing call (voice or data) that has been already accepted by the access system is moved from an access system to which it had previously been assigned to a different one.

The network, based on the CRRM policy implemented or due to lack or shortage of resources, may undertake several actions, which may affect the QoS perceived by the users. Amongst the actions that can be undertaken, and which affect the perceived QoS, there are the refusal of a new call (a call not originating from a handover from another cell), and the termination of a call originating from a handover from another cell. Amongst the actions that can be undertaken, and that do not affect the perceived QoS, but only the network signaling, there are the change of the access technology used for managing a service which is already being served, and the change of access technology for a call originating from a handover from another cell.

According to an embodiment of the present invention, the network equipment(s) (the BSCs, the RNCs, the APCs, or the CRRM server) where the CRRM method is implemented takes decisions only when one of the following events, related to a single call, occur: incoming new call, or incoming call originating from a HO from another cell. When one of these two events occurs, the CRRM functionality implemented in the network may decide:

- to which access technology the incoming call has to be assigned (regardless of whether it is a new call or a call originating from a HO);
- whether to activate VHO mechanisms for re-assigning one or more other, already ongoing calls and initially assigned to an access technology, to a different one.

From the viewpoint of a generic cell, both new calls and calls originating from HOs from other cells are seen as new service requests; however, new calls may be blocked, in order to improve the global level of performance; on the contrary, calls originating from handovers should not be dropped, unless it is impossible to serve them.

In essence, the method according to an embodiment of the present invention provides for the following actions:

- new voice calls are preferably assigned to the GSM;
- new data exchange service requests are preferably assigned to the WLAN;
- calls originating from HOs are preferentially kept on the same access system;
- in case of lack of the resources necessary for serving a new call or an already ongoing call (due to a HO or due the necessity of changing the radio access system due to radio coverage reasons), before refusing the new call or dropping the call already going on, an attempt is made to free radio resources exploiting VHO mechanisms.

According to an embodiment of the present invention, making reference to the scenario of FIG. 1, the re-assignment (exploiting VHO mechanisms) of ongoing calls to different radio access system is attempted in the following four situations (the underlying assumption is that it is not possible to directly assign the radio resources necessary for managing a service request, because on the contrary it would not be necessary to rely on the VHO).

a) Voice Call Request that can be Served Only by the GSM

In this case, the network attempts to free the GSM radio resources necessary for accepting the voice call by performing a VHO in respect of a voice call already going on in the GSM, but that can be indifferently served by both the GSM and the UMTS, moving the selected ongoing voice call from the GSM to the UMTS (this action is hereinafter denoted "action A1").

If the action A1 is not possible because there are no GSM voice calls that can be moved to the UMTS, the voice call request is refused.

If instead the action A1 is not possible because there are no sufficient UMTS resources available for accepting the voice call coming from the GSM, the network, as an alternative, attempts to perform a number N of VHOs in respect of data exchange calls currently being served by the UMTS, but that can indifferently be served by both the UMTS and the WLAN, moving the selected N data exchange calls from the UMTS to the WLAN; the number N is calculated, based on the capacity region of the UMTS cell, in such a way that the UMTS resources that, as a consequence of the VHOs, would be set free are sufficient to serve a voice call on the UMTS. Then, a VHO is performed in respect of an ongoing voice call that is currently served by the GSM, moving it to the UMTS (this set of actions is hereinafter referred to as "action A2").

If even the action A2 cannot be undertaken (due to the absence of UMTS data exchange sessions that can be moved to the WLAN, or because there are no ongoing GSM voice calls that can be moved to the UMTS), then the voice call request is refused.

b) Voice Call Request that can be Served by Both the GSM and the UMTS

In this case, the network attempts to free UMTS radio resources necessary for the voice call by performing a number M of VHOs involving ongoing data exchange calls currently served by the UMTS, but that can be indifferently served by both the UMTS and the WLAN, moving them from the UMTS to the WLAN; the number M is calculated based on the capacity region of the UMTS cell, in such a way that the UMTS resources that, as a consequence of the VHOs, would be set free are sufficient to serve a voice call on the UMTS (this set of actions is hereinafter referred to as "action B2").

If the action B2 is not possible (due to the lack of data exchange connection on the UMTS that can be moved to the WLAN, or to the lack of WLAN resources available), then the voice call request is refused.

c) Data Exchange Call Request that can be Served by the UMTS Only

In this case, the network tries to free radio resources necessary for the data call request on the UMTS, by undertaking the above described action B2 (with the number M=1).

If this is not possible, as an alternative the network performs a number Q of VHOs involving ongoing voice calls, served by the UMTS, but that can be served by both the GSM and the UMTS, moving them from the UMTS to the GSM; the number Q is calculated based on the capacity region of the UMTS cell, in such a way that the resources that, as a consequence of the VHOs, would be set free are sufficient for managing the data call request on the UMTS (this set of actions is hereinafter referred to as "action B1").

If also the action B1 is not possible (for example due to absence of UMTS voice calls, or because there are no GSM resources available), then the data exchange call request is refused.

d) Data Exchange Call Request that can be Served by Both the UMTS and the WLAN

In this case, the network tries to free the resources necessary for the data call request on the UMTS by means of the action B1; if this is not possible, then the call request is refused.

It is pointed out that the network, before actually performing any of the actions A1, A2, B1 or B2, preliminary assesses the possibility of actually performing said action, by calculating the amount of resources that should be set free, based on the capacity region and checking the availability of the needed resources; in case it appears that the action cannot be fully accomplished, the action is not undertaken, and the status quo is maintained.

In greater detail, the schematic flowcharts of FIGS. 6, 7, 8 and 9 depict the main steps performed for the six cases of different service requests that may occur considering the scenario of FIG. 1.

Figure 6:
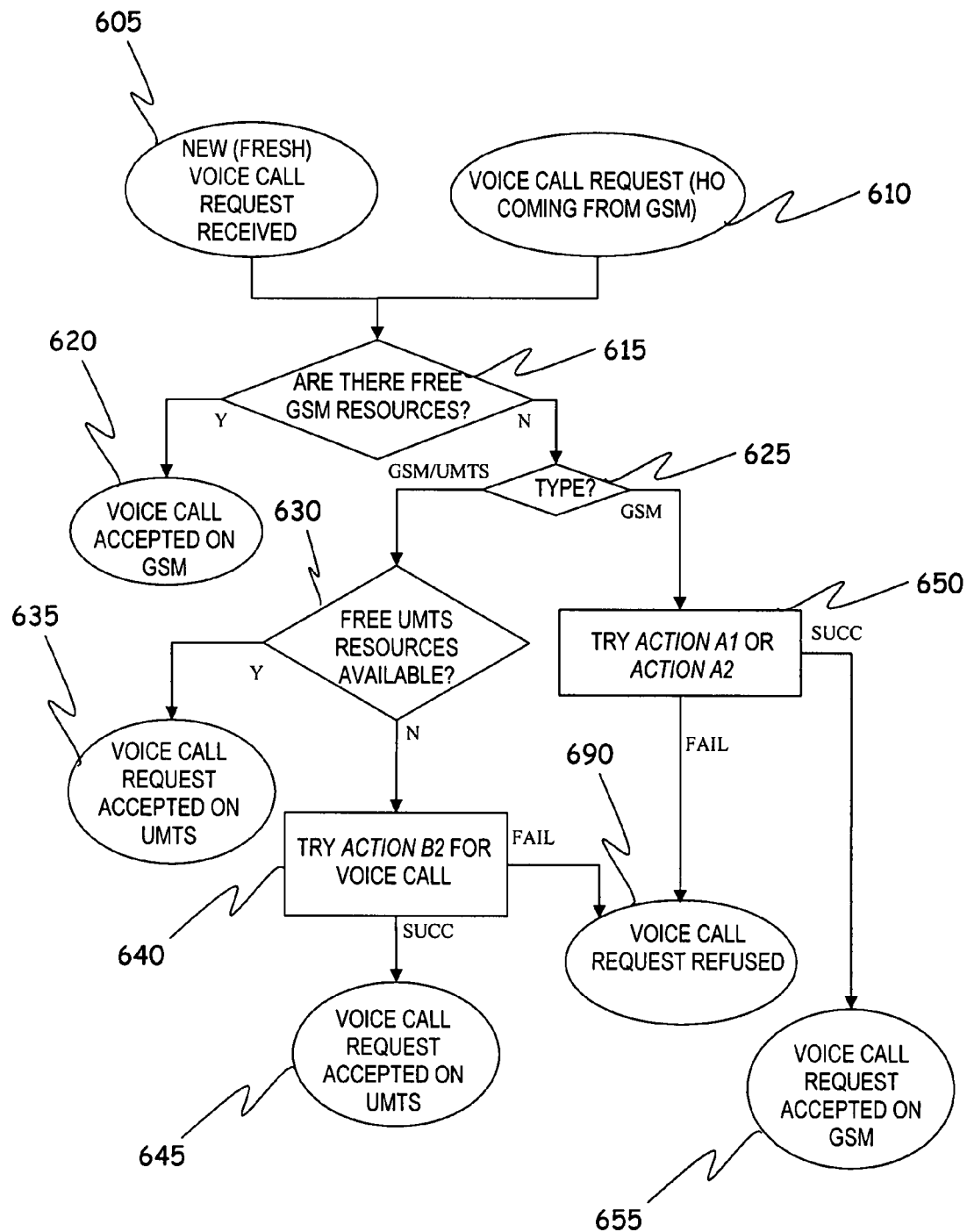
FIG. 6 shows, in terms of a schematic flowchart, the main flow of operation of a CRRM method according to an embodiment of the present invention, for two types of service request received by the network.

In particular, the flowchart of FIG. 6 relates to the case in which the network, particularly a GSM cell thereof, receives a new service request from a user that wishes to set up a new ("fresh") voice call (case 1, box 605), or the case in which, for radio coverage problems, the network receives a HO request for a voice call coming from a different GSM cell (case 2, box 610). In these two cases, the network assesses whether the considered GSM cell still has available resources to devote to serving the incoming call (decision box 615). In the affirmative case (exit branch Y of decision box 615), the voice call is assigned to the GSM (box 620). In the negative case (exit branch N of decision box 615), it is ascertained whether the incoming voice call request can be indifferently served by both the GSM and the UMTS, or rather it can only be served by the GSM (decision box 625). If the voice call request can be indifferently served by the GSM or the UMTS (exit branch GSM/UMTS of decision box 625), then it is assessed whether there are enough UMTS resources available (decision box 630). In the affirmative case (exit branch Y of decision box 630), the voice call is accepted and assigned to the UMTS (box 635). If there are not enough UMTS resources for serving the voice call request (exit branch N of decision box 630), an attempt to free UMTS resources is made (box 640), trying to perform the action B2 discussed above for a voice call. If the attempt fails (exit FAIL of box 640), the voice call request is refused (box 690); if the attempt succeeds (exit SUCC of box 640), the voice call request is accepted and assigned to the UMTS (box 645). If the incoming voice call request can only be served by the GSM (exit branch GSM of decision box 625), an attempt is made to free GSM resources (box 650), performing the action A1 or the action A2 discussed in the foregoing. If the attempt fails (exit FAIL of box 650), the voice call request is refused; if the attempt succeeds (exit SUCC of box 650), the voice call request is accepted and assigned to the GSM (box 655).

Figure 7:
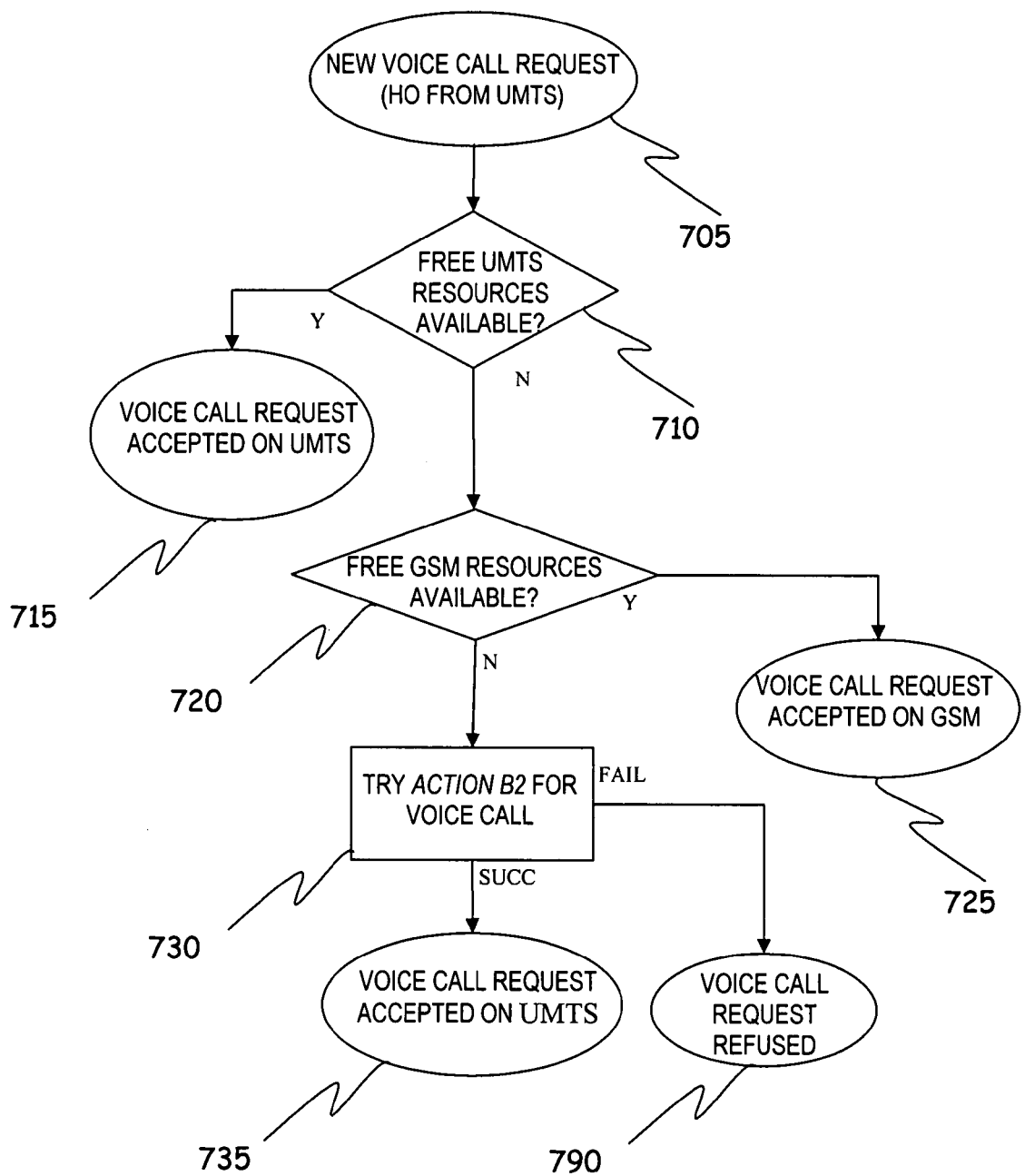
FIG. 7 shows, in terms of a schematic flowchart, the main flow of operation of a CRRM method according to an embodiment of the present invention, for a third type of service request received by the network.

The flowchart of FIG. 7 relates to the case in which the network, particularly a generic UMTS cell thereof, receives a HO request in respect of a voice call coming from a different UMTS cell (case 3, box 705). In this case, it is necessary to assess whether the considered UMTS cell still has available radio resources sufficient for serving the request (decision box 710). In the affirmative (exit branch Y of decision box 710), the voice call request is accepted and assigned to the UMTS (box 715); in the negative case (exit branch N of decision block 710), the network assesses whether there are still available GSM resources sufficient for serving the voice call request (decision box 720). In the affirmative case (exit branch Y of decision box 720), the voice call request is accepted and assigned to the GSM (box 725). In the negative case, the network attempts to free UMTS resources (box 730), undertaking the action B2 discussed in the foregoing for a voice call. If the attempt fails (exit branch FAIL of box 730), the voice call request is refused (box 790), otherwise (exit branch SUCC of box 730), the voice call request is accepted and assigned to the UMTS.

Figure 8:
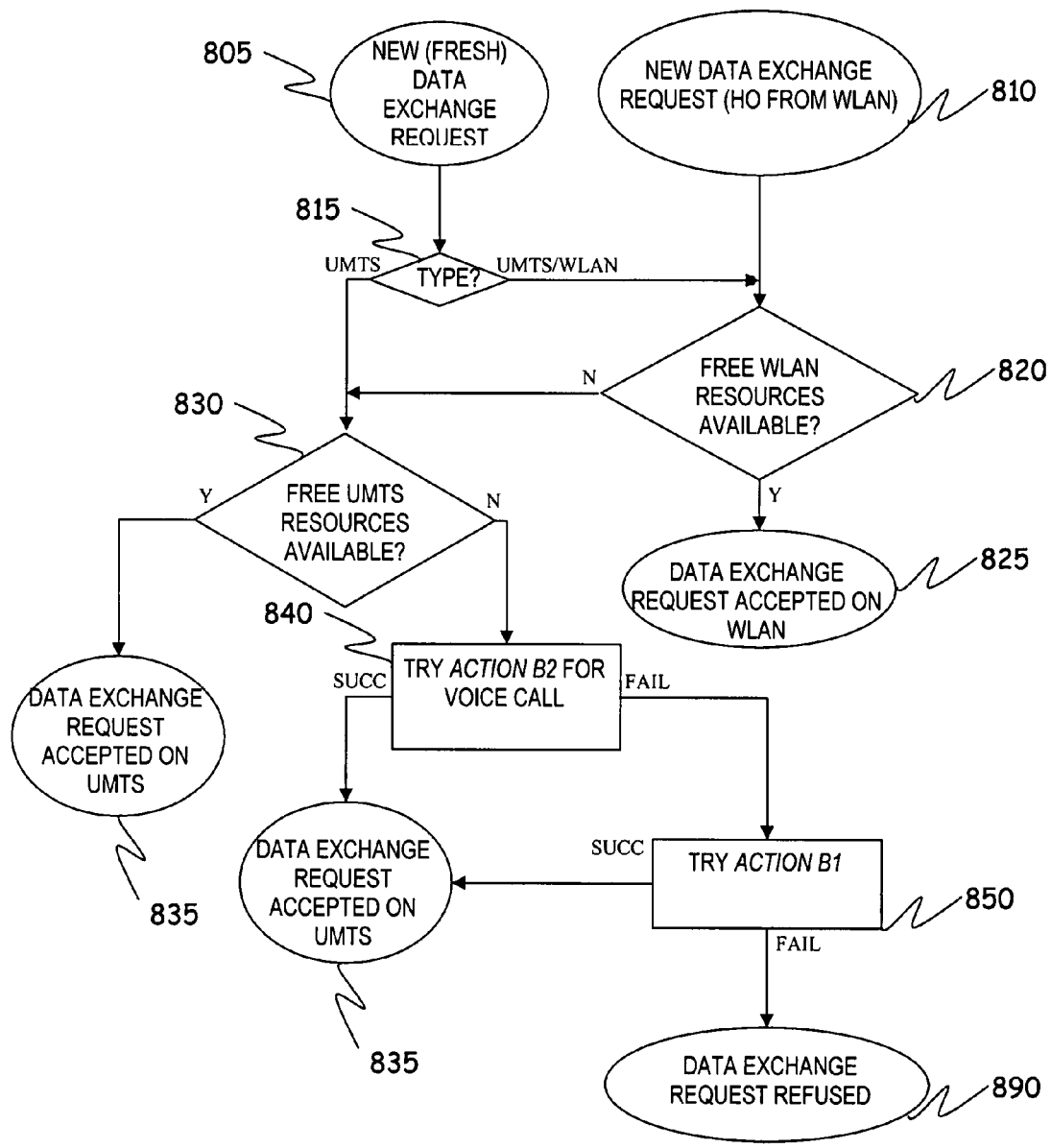
FIG. 8 shows, in terms of a schematic flowchart, the main flow of operation of a CRRM method according to an embodiment of the present invention, for a fourth and a fifth type of service request received by the network.

The flowchart of FIG. 8 relates to the case in which the network receives a service request from a user wishing to set up a new data exchange call (case 4, box 805), or the case in which, due to bad radio quality issues, the network receives a request of HO for a data exchange call from a different WLAN cell (case 5, box 810).

Preliminary, the network assesses whether the received data exchange call request can be indifferently served by the UMTS or the WLAN (decision box 815). In the affirmative case (exit branch UMTS/WLAN of decision box 815), it is ascertained whether the WLAN still has available radio resources to be assigned to the service request (decision box 820); in the affirmative case (exit branch Y of decision box 820), the service request is accepted and it assigned to the WLAN (box 825); in the negative case (exit branch N of decision block 820), as well as in the case the service request can only be served by the UMTS (exit branch UMTS of decision box 815) the network assesses whether the UMTS still has sufficient radio resources available for serving the request (decision box 830). In the affirmative case (exit branch Y of decision box 830), the service request is accepted and assigned to the UMTS (box 835); in the negative case (exit branch N of decision box 830), the network performs an attempt to free UMTS resources (box 840), undertaking the above discussed action B2 for a voice call. If the attempt succeeds (exit branch SUCC of box 840), the service request is accepted and assigned to the UMTS (box 845); if the attempt fails (exit branch FAIL of box 840), the network performs an attempt to free UMTS radio resources (box 850) by undertaking the above discussed action B1. If the attempt succeeds (exit branch SUCC of box 850), the service request is accepted and assigned to the UMTS, otherwise (exit branch FAIL of box 850) the service request is refused (890).

Figure 9:
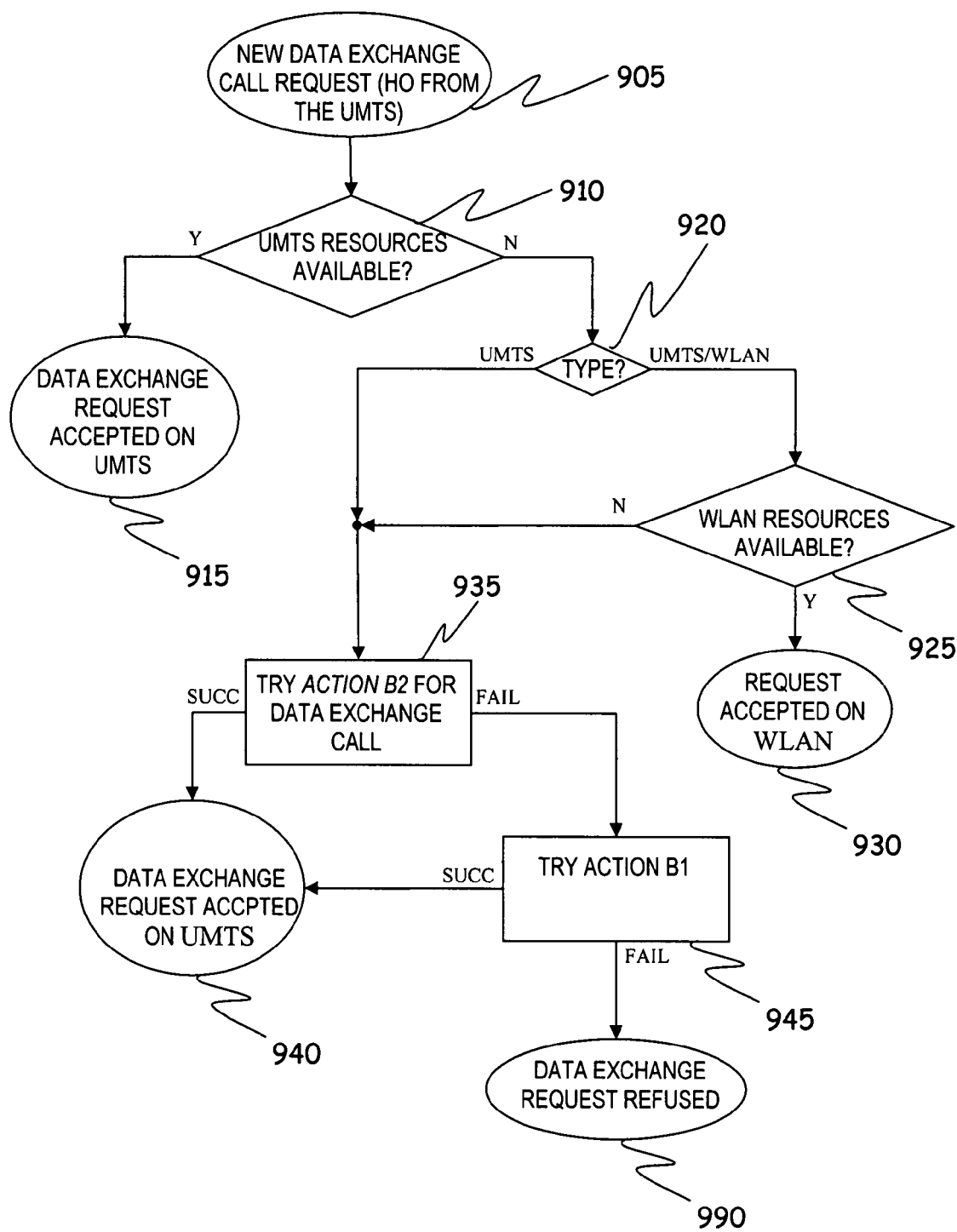
FIG. 9 shows, in terms of a schematic flowchart, the main flow of operation of a CRRM method according to an embodiment of the present invention, for a sixth type of service request received by the network.

The flowchart of FIG. 9 relates to the case in which the network receives a HO request for a data exchange call from a different UMTS cell (case 6, box 905). Firstly, it is assessed whether the considered UMTS cell still has sufficient radio resources available for accepting the service request (decision box 910). In the affirmative case (exit branch Y of decision box 910), the service request is accepted and assigned to the UMTS (box 915). In the negative case, the network evaluates whether the service request can be indifferently served by the UMTS or the WLAN, or by the UMTS only (decision box 920). If the service request can be served by the UMTS or the WLAN (exit branch UMTS/WLAN of decision box 920), it is assessed whether the WLAN has sufficient resources available for accepting the service request (decision box 925). In the affirmative case, the service request is accepted, and it is assigned to the WLAN (box 930). In the negative case (exit branch N of decision box 925), or in the case the service request can only be served by the UMTS (exit branch UMTS of decision box 920), the network attempts to free UMTS radio resources (box 935), undertaking the action B2 for a data exchange call discussed above. If the attempt succeeds (exit branch SUCC of box 935), the service request is accepted and assigned to the UMTS (box 940), otherwise (exit branch FAIL of box 935), the network attempts to free UMTS resources (box 945) undertaking the above discussed action B1. If this attempt succeeds (exit branch SUCC of box 945), the service request is accepted and assigned to the UMTS, otherwise it is refused (box 990).

Figure 10:
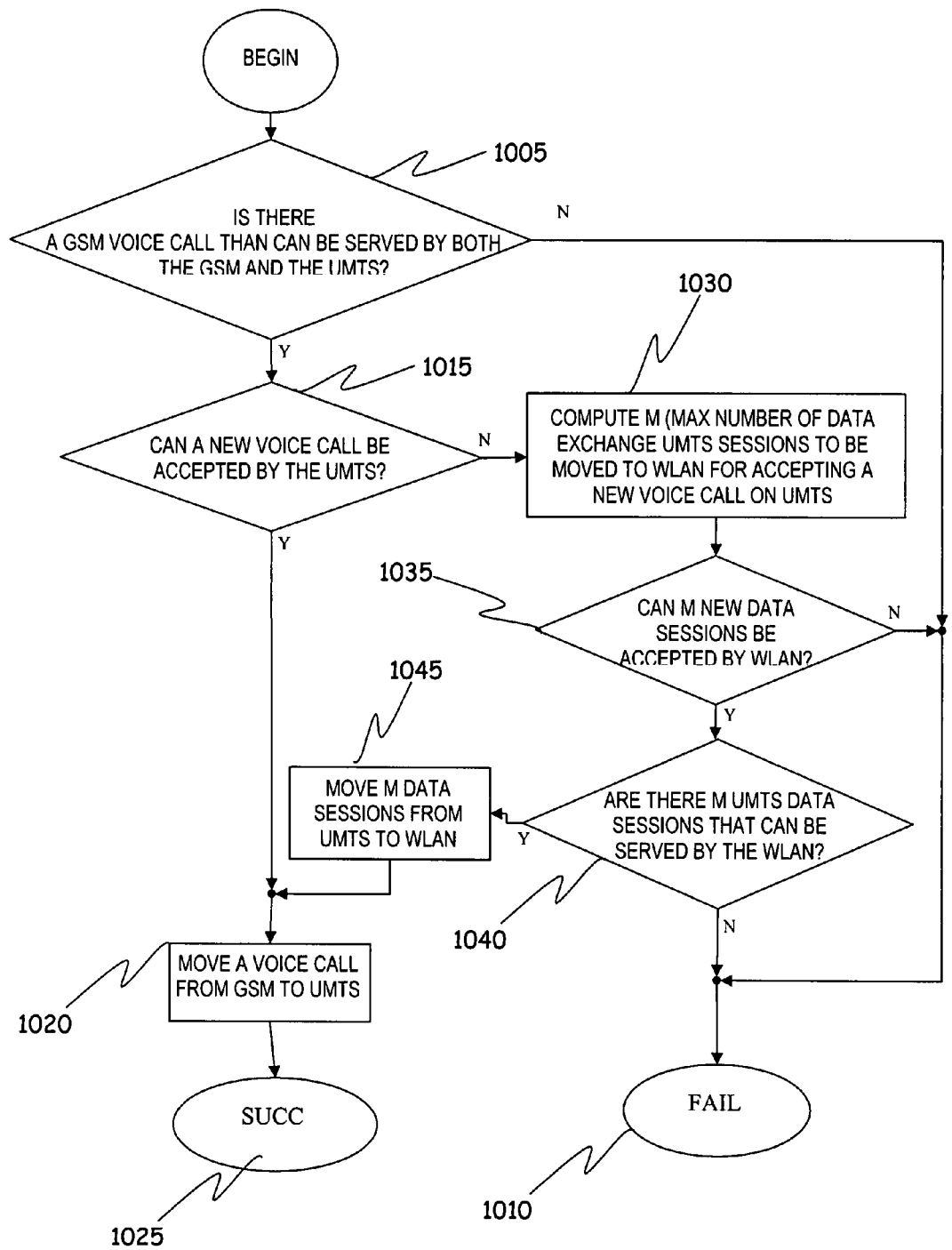
FIG. 10 shows, in terms of a schematic flowchart, the main steps of a first and second type of actions attempted by the CRRM method according an to embodiment of the present invention to free resources for allocating a received service request.

The actions A1 and A2 discussed in the foregoing are described in detail hereinafter, with reference to the schematic flowchart of FIG. 10. Firstly, it is ascertained whether there is at least one ongoing GSM call that could also be served by the UMTS (decision box 1005); this may for example involve checking if, there is a user who is involved in a voice call who has a dual-mode mobile terminal capable of operating with both the GSM and the UMTS; in addition, it may involve assessing that the radio signal quality is good for both the GSM and the UMTS. In the negative case (exit branch N of decision box 1005), the VHO attempt fails (box 1010), and neither one of the actions A1 or A2 can be undertaken. In the affirmative case (exit branch Y of decision box 1005), it is ascertained whether the considered UMTS cell, to which the voice call could in principle be moved (the UMTS cell that covers the area where the user with the dual-mode terminal is located) has sufficient resources available for accepting a new voice call (decision box 1015). If yes (exit branch Y of decision box 1015), the action A1 is undertaken: the previously identified one of the existing voice calls already assigned to the GSM is moved to the UMTS (box 1020), and the attempt succeeds (box 1025). In the negative case (exit branch N of decision box 1015), the minimum number M of data exchange connections that should be moved from the UMTS to the WLAN for enabling the latter to accept a new voice call request is calculated (box 1030), based on the UMTS cell capacity region. Then, it is ascertained whether the WLAN is capable of accepting a number of new data exchange connections equal to the calculated number M (decision box 1035), based on a WLAN cell capacity region or on the network joint capacity region. In the negative case (exit branch N of decision box 1035), no action is undertaken, and the attempt fails; in the affirmative case (exit branch Y of decision box 1035), it is ascertained whether, on the UMTS, there are at least M data exchange connections that can be served indifferently by the UMTS and the WLAN (decision box 1040); for this, the UMTS cell capacity region is exploited; in the affirmative case (exit branch Y of decision box 1040), a number M of data exchange connections currently going on in the UMTS is moved to the WLAN (box 1045), and the attempt succeeds. Otherwise (exit branch N of decision box 1040), no action is undertaken, and the attempt fails.

Figure 11:
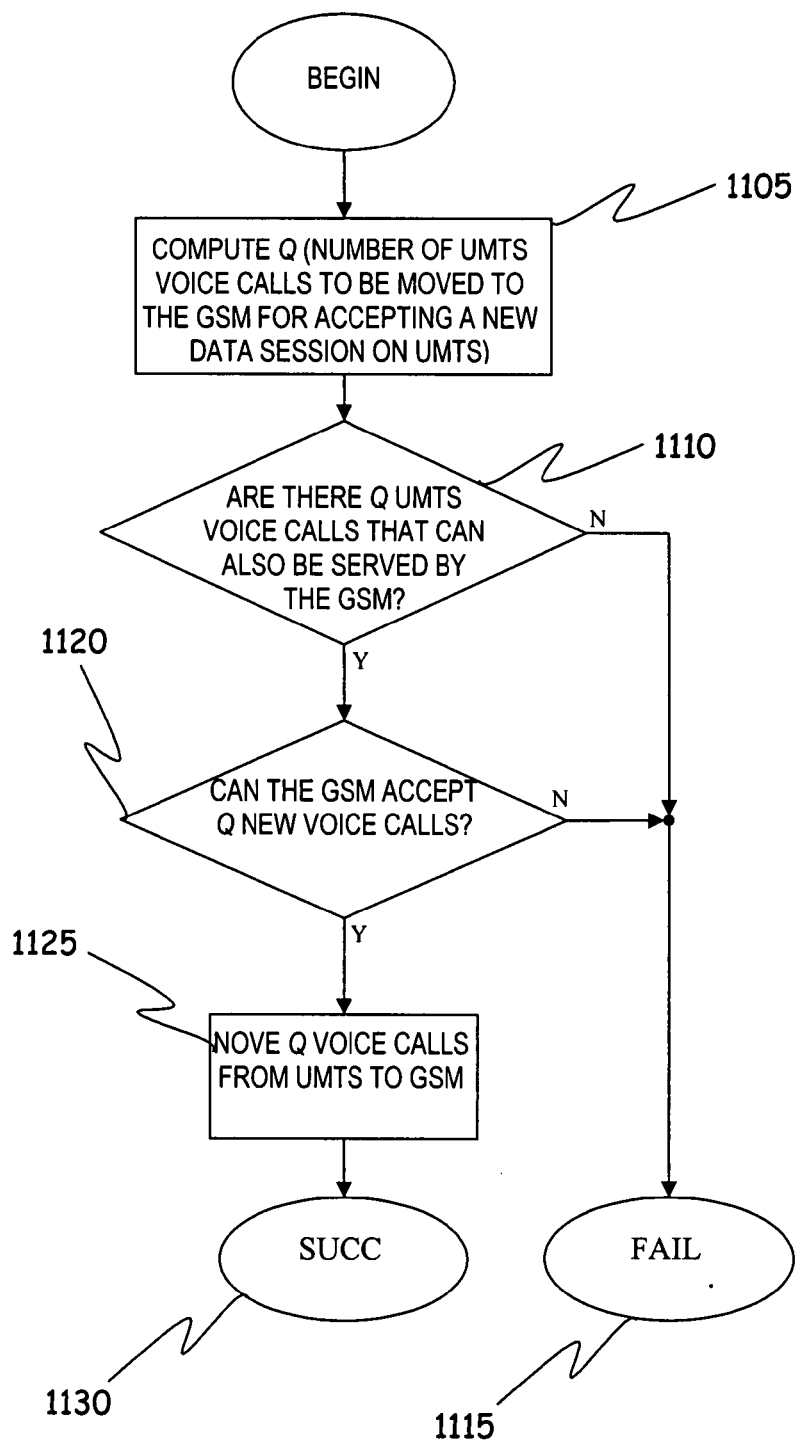
FIG. 11 shows, in terms of a schematic flowchart, the main steps of a third type of action attempted by the CRRM method according an to embodiment of the present invention to free resources for allocating a received service request.

The flowchart of FIG. 11 schematically shows in greater detail how the "action B1" can be carried out. Firstly, a number Q of voice calls that should be removed from the UMTS for enabling the UMTS accepting a new data exchange connection is calculated (box 1105), based on the UMTS cell capacity region or on the network joint capacity region. Then, it is assessed whether, on the UMTS, there are at least Q voice calls that could as well be served by the GSM (decision box 1110). In the negative case (exit branch N of decision box 1110), no action is undertaken, and the attempt fails (box 1115). In the affirmative case (exit branch Y of decision box 1110), it is ascertained whether the GSM can accept Q new voice calls (decision box 1120). In the negative case (exit branch N of decision box 1120), no action is undertaken and the attempt fails; in the affirmative case (exit branch Y of decision box 1120), Q voice calls that are currently served by the UMTS and that can indifferently be served by the GSM or the UMTS are moved to the GSM (box 1125). The attempt thus succeeds (box 1130).

Figure 12:
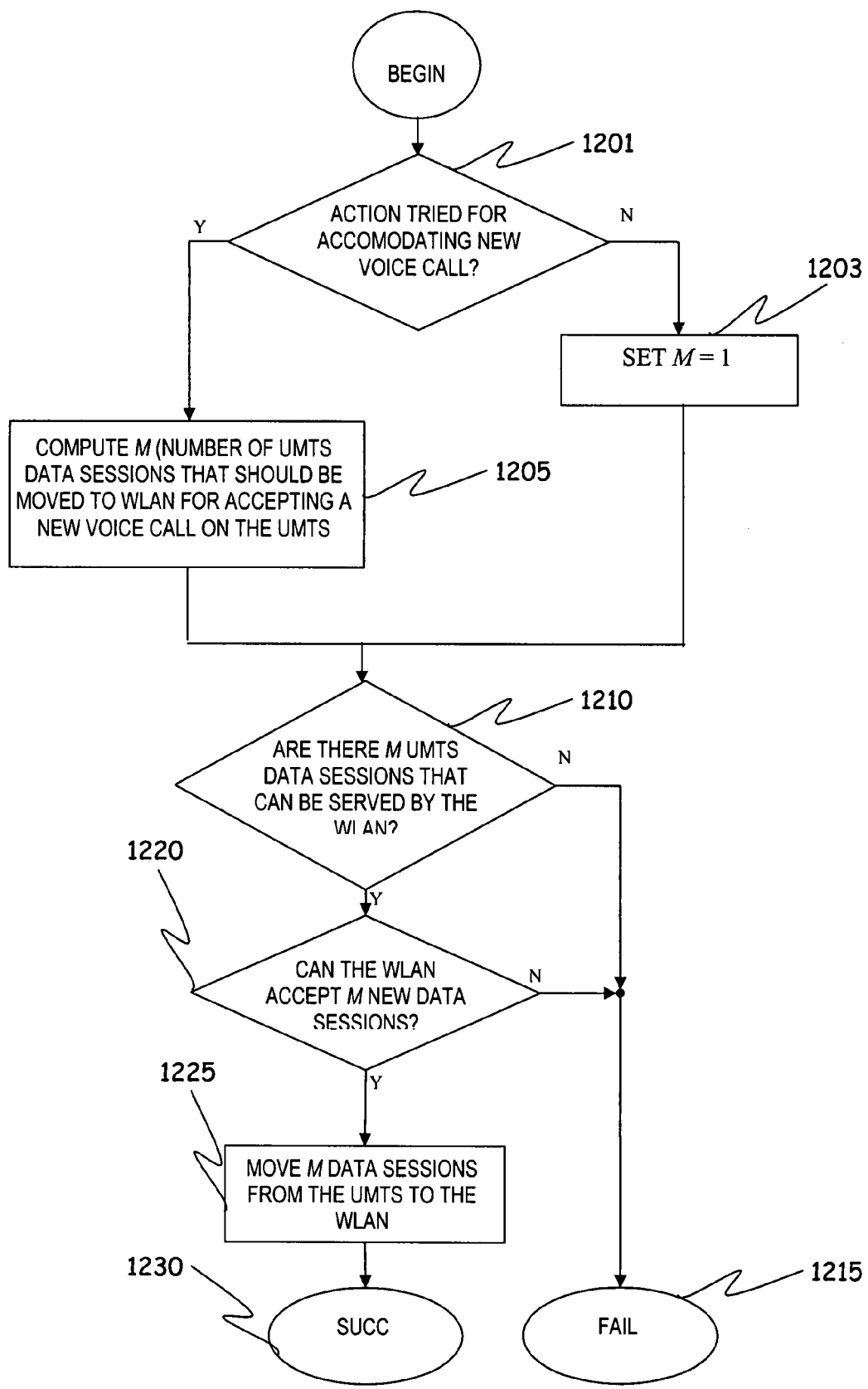
FIG. 12 shows, in terms of a schematic flowchart, the main steps of a fourth type of action attempted by the CRRM method according an to embodiment of the present invention to free resources for allocating a received service request.

The flowchart of FIG. 12 schematically shows in greater detail how the "action B2" is carried out.

Firstly, it is decided whether the "action B2" is tried to free resources necessary for a new voice call request or a new data exchange connection request (decision box 1201). In case the "action B2" is tried to free resources necessary for a new data exchange connection request (exit branch N of decision box 1201), the variable M used in the following is set equal to 1 (box 1203); in case instead the "action B2" is tried to make room for a new voice call request (exit branch Y of decision box 1201), the minimum number M of data exchange connections that should be removed from the UMTS for accepting a new voice call request on the UMTS is calculated (box 1205), based on the UMTS cell capacity region or on the joint capacity region. Then, it is ascertained whether there are, on the UMTS, at least M data exchange connections that could as well be served by the WLAN (decision box 1210). In the negative case (exit branch N of decision box 1210), no action is undertaken, and the attempt fails (box 1215). In the affirmative case (exit branch Y of decision box 1210), it is ascertained whether the WLAN is capable of accepting M new data exchange connections (decision box 1220). In the negative case (exit branch N of decision box 1220), no action is undertaken, and the attempt fails. In the affirmative case (exit branch Y of decision box 1220), the M data exchange connections previously identified are moved from the UMTS to the WLAN (box 1225), and the attempt succeeds (box 1230).

The method according to the present invention ensures a low probability that new calls are refused, a low probability that an ongoing call is terminated, even during a handover, a low frequency of VHOs for ongoing calls, and a low probability of change of the access system for calls originating from handovers from other cells.

The method according to the present invention has been described making reference to an exemplary scenario, which is not to be considered limitative. In particular, in the above description the assumption has been made that a single cell for each of the available access systems is considered; this is a reasonable assumption, because CRRM algorithms normally manage the radio resources at the level of the individual cells of the different access systems. Nevertheless, nothing prevents from applying the method of the invention in a more general context. For example, a CRRM algorithm might be defined for a whole network portion, covering a certain geographic area: it is sufficient to consider all the different cells, analyzing the relationship between the cells of different access systems that cover a common area.

The method according to the present invention has been described considering as available access systems the GSM, the UMTS and the WLAN. However, this is not to be construed as a limitation of the present invention, which is instead applicable in general, irrespective of the number and specific type of different access systems available. It is thus sufficient that the different access systems have a (direct or indirect) maximum limit to the number of users for a given service which can be managed with the available radio resources. This occurs in all the practical cases, where, in general, the different access systems can exploit a limited number of resources. Depending on the considered specific standard, the maximum limit is determined by the specific transmission techniques adopted and by related practical issues. For example, each cell of the GSM system has a maximum number of voice circuits, determined during the system planning, whereas in the UMTS the limit may be due to the maximum interference that the system can sustain with the available power, or the number of codes that can be used to identify each user. In other systems, like the WLAN, the maximum number of users for a given service that a hot-spot can manage may be determined based on the minimum level of service quality which is intended to be offered to the users (setting for example a minimum limit to the data transfer speed that is intended to be guarantee for each of the users, or a limit to the tolerable transmission delays).

Also, even if the method of the invention has been described considering just two services (voice calls and data exchange calls), which originate four different kinds of service requests, nothing prevents from applying the method to cases in which the number and/or the types of services are different.

Another possible application of the method of the present invention is within a single access system, where however there are two or more cell layers belonging to different "radio modes". For example, this is the case of different hierarchical layers in a cellular network having a hierarchic cell structure, or in the case of layers making use of different frequencies. In the first case, moving a service which is already being provided may exploit the "intra-system handover" procedure (which involves the passage from a UTRAN cell to another UTRAN cell on the same carrier frequency, as prescribed in the 3GPP TS 25.331), whereas in the second case the "inter-frequency handover" procedure may be exploited (which involves the passage from a UTRAN cell to another UTRAN cell over a different carrier frequency). In fact, a system that exploits a same radio technology in at least two different layers differing in the hierarchic level (like in the MACRO and MICRO cell) or in the frequency may be regarded as a heterogeneous system, in terms of coverage, since there is the problem of jointly managing the radio resources of the cells belonging to the different layers. Also in these cases, the method of the invention can be exploited to determine which layer is more suitable for offering a requested service; in other words, the method of the present invention is applicable in general to any heterogeneous network, irrespective of where the heterogeneity resides (in the radio access technology, in the number of layers, etc.).

The method can be applied in software, hardware, or as a mix of software and hardware. In particular, it may be implemented by means of a firmware, executed by microprocessors/microcontrollers of the network apparatuses like the RNCs, the BSCs, the APCs, and/or the CRRM server.

Also, albeit in the foregoing only service requests originating from the users have been considered, this is not to be considered a limitation, because the method applies as well to service requests originating from the network (for example, the network may reach the users for offering a certain service).

The present invention has been herein described making reference to an illustrative and non-limitative embodiment thereof. Those skilled in the art will recognize that several modifications can be made to the described embodiments, for example in order to satisfy contingent needs, as well as several other embodiments are possible, without departing from the scope of protection set forth in the appended claims.

The invention claimed is:

1. A method of managing radio resources of a radio communications network, comprising:
upon receiving a new service request for a service to be provided, assessing whether there are radio resources of a first set adapted to and available for satisfying the new service request, and:
in the affirmative case, exploiting the available radio resources of the first set for satisfying the new service request;
in the negative case:
calculating an amount of adapted radio resources of the first set to be set free for satisfying the new service request;
assessing whether there is at least one first already-served service request that, at the time the new service request is received, is being served using the calculated amount of radio resources of the first set, and that can continue to be served by assigning thereto radio resources of a second set, different from the first set, not adapted to serving the new service request;
in the affirmative case:
calculating an amount of radio resources of the second set necessary for serving said at least one first already-served service request;
assessing whether the calculated amount of radio resources of the second set is available;
if the calculated amount of radio resources of the second set is available, re-assigning, to the at least one first already-served service request, the radio resources of the second set, and assigning, to the new service request, the radio resources of the first set previously assigned to the at least one first already-served service request; and
in the negative case, refusing the new service request.

2. The method of claim 1, wherein the radio resources of a radio communications network further comprise a third set of radio resources, different from the first and second sets, and further comprising:

if the calculated amount of radio resources of the second set is not available:

assessing whether there is at least one second already-served service request that, at the time the new service request is received, is being served using the calculated amount of the radio resources of the second set, and that can continue to be served by assigning thereto radio resources of the third set;

in the affirmative case:

calculating an amount of the radio resources of the third set necessary for serving said at least one second already-served service request;

assessing whether the calculated amount of radio resources of the third set is available;

if the calculated amount of radio resources of the third set is available, re-assigning to the at least one second already-served service request the radio resources of the third set, re-assigning to the at least one first already-served service request the radio resources of the second set previously assigned to the at least one second already-served service request, and assigning to the new service request the radio resources of the first set previously assigned to the at least one first already-served service request; and in the negative case, refusing the new service request.

3. The method of claim 1, further comprising:

determining a service capacity of the radio communications network; and exploiting the determined service capacity in calculating the amount of the radio resources.

4. The method of claim 3, wherein determining the network service capacity comprises determining a level of availability of the radio resources of one among the first set and the second set as a function of the exploitation of the radio resources of the second set, respectively of the first set.

5. The method of claim 2, further comprising:

determining a service capacity of the radio communications network; and exploiting the determined service capacity in said calculating the amount of the radio resources, wherein determining the network service capacity comprises determining a level of availability the radio resources of each one among the first set, the second set and the third set as a function of the exploitation of the radio resources of the other two sets.

6. The method of claim 1, wherein the radio communications network is a heterogeneous network comprising a second-generation mobile telephony network, a third-generation mobile telephony network, or a broadband wireless data network.

7. An apparatus for managing radio resources of a radio communications network, comprising an apparatus capable of being adapted to:

upon receiving a new service request for a service to be provided, assessing whether there are radio resources of a first set adapted to and available for satisfying the new service request, and:

in the affirmative case, exploiting the available radio resources of the first set for satisfying the new service request;

in the negative case;

calculating an amount of the adapted radio resources of the first set to be set free for satisfying the new service request;

assessing whether there is at least one first already-served service request that, at the time the new service request is received, is being served using the calculated amount of radio resources of the first set, and that can continue to be served by assigning thereto radio resources of a second set, different from the first set, not adapted to serving the new service request;

in the affirmative case:

calculating an amount of radio resources of the second set necessary for serving said at least one already-served service request;

assessing whether the calculated amount of radio resources of the second set is available;

if the calculated amount of radio resources of the second set is available, re-assigning to the at least one first already-served service request, the radio resources of the second set, and assigning to the new service request the radio resources of the first set previously assigned to the at least one first already-served service request; and in the negative case, refusing the new service request.

8. The apparatus of claim 7, wherein the radio resources of a radio communications network further comprise a third set of radio resources, different from the first and second sets, and capable of being further adapted to:

if the calculated amount of radio resources of the second set is not available:

assessing whether there is at least one second already-served service request that, at the time the new service request is received, is being served using the calculated amount of the radio resources of the second set, and that can continue to be served by assigning thereto radio resources of the third set;

in the affirmative case:

calculating an amount of the radio resources of the third set necessary for serving said at least one second already-served service request;

assessing whether the calculated amount of radio resources of the third set is available;

if the calculated amount of radio resources of the third set is available, re-assigning to the at least one second already-served service request the radio resources of the third set, re-assigning to the at least one first already-served service request the radio resources of the second set previously assigned to the at least one second already-served service request, and assigning to the new service request the radio resources of the first set previously assigned to the at least one first already-served service request; and in the negative case, refusing the new service request.

9. The apparatus of claim 7, capable of being further adapted to:

determining a service capacity of the radio communications network; and exploiting the determined service capacity in calculating the amount of the radio resources.

10. The apparatus of claim 9, wherein determining the network service capacity comprises determining a level of availability of the radio resources of one among the first set and the second set as a function of the exploitation of the radio resources of the second set, respectively of the first set.

11. The apparatus of claim 8, capable of being further adapted to:
- determining a service capacity of the radio communications network; and
- exploiting the determined service capacity in calculating the amount of radio resources, wherein determining the network service capacity comprises determining a level of availability the radio resources of each one among the first set, the second set and the third set as a function of the exploitation of the radio resources of the other two sets.

12. The apparatus of claim 7, wherein the radio communications network is a heterogeneous network comprising a second-generation mobile telephony network, a third-generation mobile telephony network, or a broadband wireless data network.

* * * * *